United States Patent
Tsuda

(10) Patent No.: US 11,644,836 B2
(45) Date of Patent: May 9, 2023

(54) AUTOMATED DRIVING SYSTEM, AUTOMATED DRIVING METHOD, AND COMPUTER READABLE MEDIUM

(71) Applicant: Mitsubishi Electric Corporation, Chiyoda-ku (JP)

(72) Inventor: Yoshiaki Tsuda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 216 days.

(21) Appl. No.: 16/954,743

(22) PCT Filed: Jan. 19, 2018

(86) PCT No.: PCT/JP2018/001603
§ 371 (c)(1),
(2) Date: Jun. 17, 2020

(87) PCT Pub. No.: WO2019/142322
PCT Pub. Date: Jul. 25, 2019

(65) Prior Publication Data
US 2020/0319641 A1  Oct. 8, 2020

(51) Int. Cl.
*G05D 1/02* (2020.01)
*G05D 1/00* (2006.01)
(Continued)

(52) U.S. Cl.
CPC ......... *G05D 1/0088* (2013.01); *B62D 15/025* (2013.01); *G05D 1/0274* (2013.01);
(Continued)

(58) Field of Classification Search
CPC .. B62D 15/025; G01C 21/26; G01C 21/3658; G08G 1/00; G08G 1/09; G05D 1/0088;
(Continued)

(56) References Cited

U.S. PATENT DOCUMENTS

2008/0122605 A1* 5/2008 Tengler .................... B60Q 1/44
340/467
2011/0040446 A1 2/2011 Taguchi
(Continued)

FOREIGN PATENT DOCUMENTS

JP  2014-184747 A  10/2014
JP  2016-172500 A  9/2016
(Continued)

OTHER PUBLICATIONS

International Search Report dated Apr. 10, 2018 in PCT/JP2018/001603 filed on Jan. 19, 2018, 1 page.

*Primary Examiner* — Frederick M Brushaber
*Assistant Examiner* — Matthew J. Reda
(74) *Attorney, Agent, or Firm* — Oblon, McClelland, Maier & Neustadt, L.L.P.

(57) ABSTRACT

Formation of a tire trace due to automated driving travel of an automated driving vehicle (10) is prevented. In an automated driving system (500), an in-vehicle apparatus (100) is mounted in the automated driving vehicle (10) traveling a road by automated driving. The in-vehicle apparatus (100) effects automated driving such that a vehicle position through which the automated driving vehicle (10) travels deviates from a center in a transverse direction of the road by an offset value (321) in the transverse direction of the road.

6 Claims, 11 Drawing Sheets

(51) Int. Cl.
*B62D 15/02* (2006.01)
*G01C 21/26* (2006.01)

(52) U.S. Cl.
CPC ........... *G01C 21/26* (2013.01); *G05D 1/0278* (2013.01); *G05D 2201/0213* (2013.01)

(58) Field of Classification Search
CPC ............... G05D 1/0274; G05D 1/0278; G05D 2201/0213
See application file for complete search history.

(56) References Cited

U.S. PATENT DOCUMENTS

| | | | | |
|---|---|---|---|---|
| 2011/0106349 | A1* | 5/2011 | Sakita | B60L 15/38 |
| | | | | 191/22 C |
| 2016/0272243 | A1 | 9/2016 | Matsuno et al. | |
| 2017/0082452 | A1* | 3/2017 | Sumizawa | B60W 60/001 |
| 2017/0297587 | A1 | 10/2017 | Mimura et al. | |
| 2018/0106906 | A1* | 4/2018 | Mikami | G01S 19/40 |
| 2019/0294167 | A1* | 9/2019 | Kutila | G01C 21/3461 |
| 2020/0189583 | A1* | 6/2020 | Tatourian | B60W 60/0025 |

FOREIGN PATENT DOCUMENTS

| | | |
|---|---|---|
| JP | 2017-191562 A | 10/2017 |
| WO | WO 2009/028461 A1 | 3/2009 |

\* cited by examiner

Fig. 2
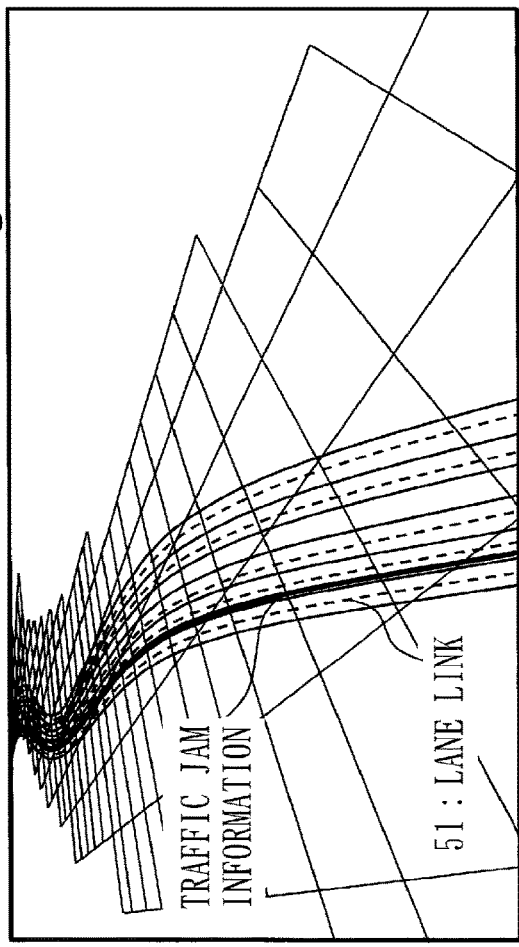
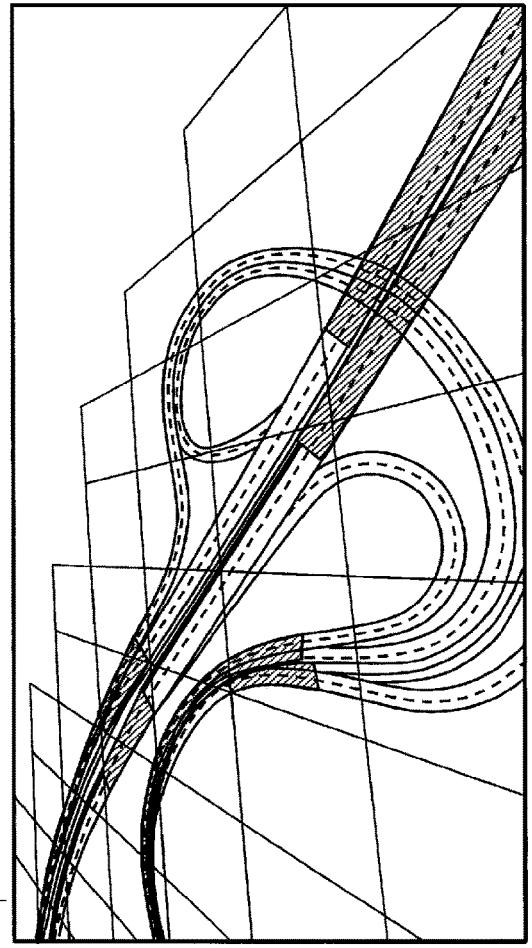

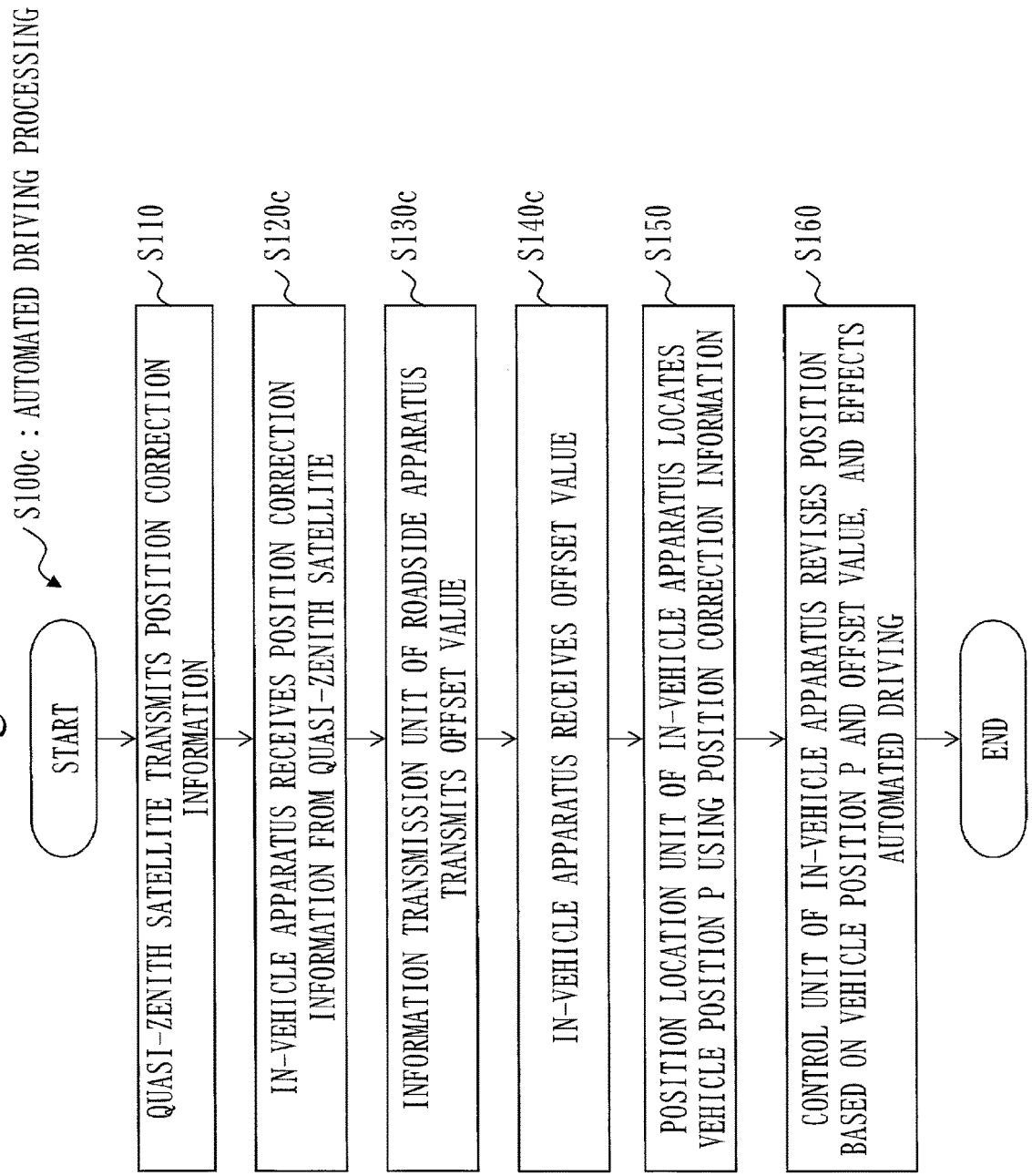

AUTOMATED DRIVING SYSTEM, AUTOMATED DRIVING METHOD, AND COMPUTER READABLE MEDIUM

TECHNICAL FIELD

The present invention relates to an automated driving system, an automated driving method, and an automated driving program.

BACKGROUND ART

Recently, techniques related to automated driving have attracted attention both in Japan and overseas. An automated driving vehicle travels by detecting its surroundings with a vehicle sensor, perceiving an obstacle, and operating a steering wheel so as to avoid the obstacle. The automated driving vehicle travels referring to a position such as a center of a road width or a center between two white lines as a guide so as to travel through the central portion of the road.

A high-precision map such as a map of a navigation terminal and a dynamic map which is studied in a SIP automated traveling system functions as follows. Note that SIP stands for cross-ministerial Strategic Innovation promotion Program.

(1) In an automated driving vehicle, a large number of sensors such as a camera, a laser, and a radar are mounted. The automated driving vehicle detects and observes its surroundings using the sensors and determines whether or not there is an obstacle around itself, such as another vehicle, a person, and a structure.

(2) The automated driving vehicle travels while perceiving the present position by performing map matching among a vehicle speed pulse or traveling speed of its own, a received Global Positioning System (GPS) signal, and navigation map data.

The automated driving vehicle travels along a middle line of a lane.

Since the automated driving vehicle travels along the middle line of the lane, many automated driving vehicles travel almost the same position on the road. Accordingly, tires cut the road to form a tire trace. This tire trace may deprive another vehicle of control of its tire and furthermore control of its steering wheel, which may lead to an accident of the vehicle such as deviation from the lane and jumping into the opposite lane. In addition, since the tire trace must be repaired, the road administrator needs to take a counter-accident measure of repair work for the tire trace formed by the automated driving vehicles, which has not been anticipated before.

Patent Literature 1 discloses a technique of traveling when there is a tire trace, to avoid the tire trace.

Patent Literature 2 discloses a technique of detecting a tire trace and switching to an automated driving mode.

Patent Literature 3 discloses a technique of detecting a tire trace and ensuring travel stability.

Patent Literature 4 discloses a technique of performing travel control when turning a curve in the presence of a tire trace on a road, so that a vehicle travels stably.

CITATION LIST

Patent Literature

Patent Literature 1: International Publication WO2009/028461
Patent Literature 2: JP 2017-191562 A
Patent Literature 3: JP 2016-172500 A
Patent Literature 4: JP 2014-184747

SUMMARY OF INVENTION

Technical Problem

The above Patent Literatures 1 to 4 disclose techniques for safety traveling in a case where a tire trace is detected. However, none of the above patent literatures discloses how to prevent formation of a tire trace.

It is an objective of the present invention to prevent formation of a tire trace due to automated driving travel of an automated driving vehicle.

Solution to Problem

An automated driving system according to the present invention includes an in-vehicle apparatus which is mounted in an automated driving vehicle traveling a road by automated driving, and which effects automated driving such that a vehicle position through which the automated driving vehicle travels deviates from a center in a transverse direction of the road by an offset value in the transverse direction of the road.

Advantageous Effects of Invention

In an automated driving system according to the present invention, an in-vehicle apparatus effects automated driving such that a vehicle position through which an automated driving vehicle travels deviates from a center in a transverse direction of a road by an offset value in the transverse direction of the road. Hence, with the automated driving system according to the present invention, formation of a tire trace due to automated driving travel of the automated driving vehicle can be prevented.

BRIEF DESCRIPTION OF DRAWINGS

FIG. 2 is a conceptual diagram of a dynamic map according to Embodiment 1.
FIG. 11 is a flowchart of automated driving processing according to Embodiment 3.

DESCRIPTION OF EMBODIMENTS

Figure 1:
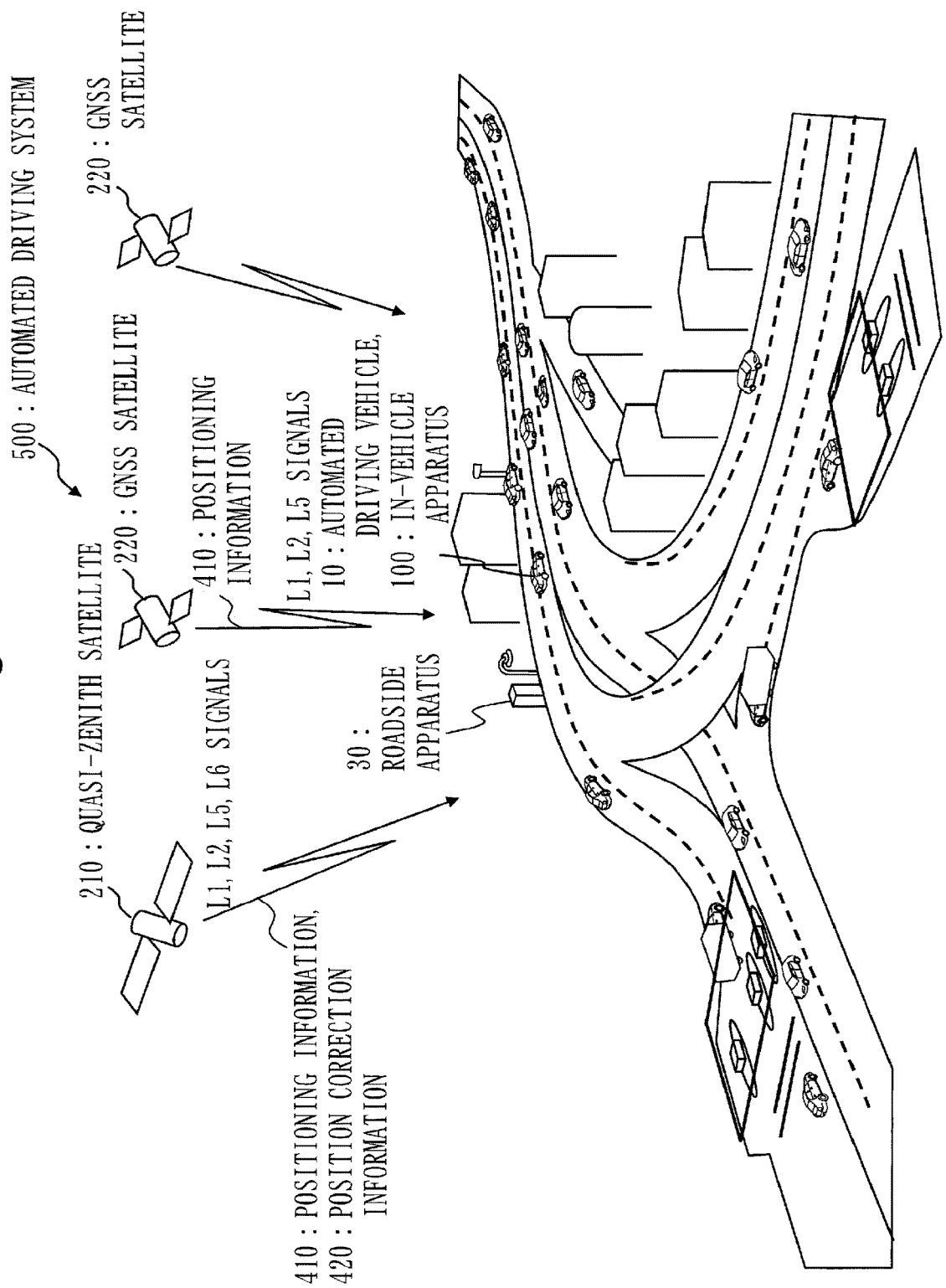
FIG. 1 is an outline diagram of an automated driving system according to Embodiment 1.

Embodiments of the present invention will be described with referring to drawings. In the drawings, the same or Embodiment 1

Description of Configuration

An outline of an automated driving system 500 according to the present embodiment will be described with referring to FIG. 1.

The automated driving system 500 is provided with an automated driving vehicle 10 and a roadside apparatus 30. The automated driving system 500 receives a satellite signal including positioning information 410 from a Global Navigation Satellite System (GNSS) satellite 220 such as GPS, Galileo, and Global Navigation Satellite System (GLONASS) satellites. The automated driving system 500 also receives a satellite signal including position correction information 420 and positioning information 410, from a quasi-zenith satellite 210. The quasi-zenith satellite 210 is a GNSS satellite. The quasi-zenith satellite 210 may be another GNSS satellite such as a GPS satellite, a Galileo satellite, and a GLONASS satellite, which transmits position correction information 420.

The automated driving vehicle 10 travels the road by automated driving. The automated driving vehicle 10 is equipped with a mounted in-vehicle apparatus 100. The automated driving vehicle 10 receives the positioning information 410 and the position correction information 420 from positioning satellites such as the quasi-zenith satellite 210 and the GNSS satellite 220 and perceives a position of its own in the traveling direction. The automated driving vehicle 10 also perceives a position of its own in a lateral direction, that is, in a transverse direction of the road, by sensors such as a camera, a laser, and a radar which are mounted in the vehicle.

The roadside apparatus 30 transmits the position correction information 420 from the quasi-zenith satellite 210 to the automated driving vehicle 10 by road-to-vehicle communication. Usually, the quasi-zenith satellite 210 transmits to the automated driving vehicle 10 the position correction information 420 for the automated driving vehicle 10 to correct its position. However, not all the automated driving vehicles 10 are equipped with mounted receivers which receive the position correction information 420 from the quasi-zenith satellite 210. Hence, the roadside apparatus 30 has a function of receiving the position correction information 420 from the quasi-zenith satellite 210 and transmitting the position correction information 420 to the automated driving vehicle 10 by the road-to-vehicle communication.

Figure 3:
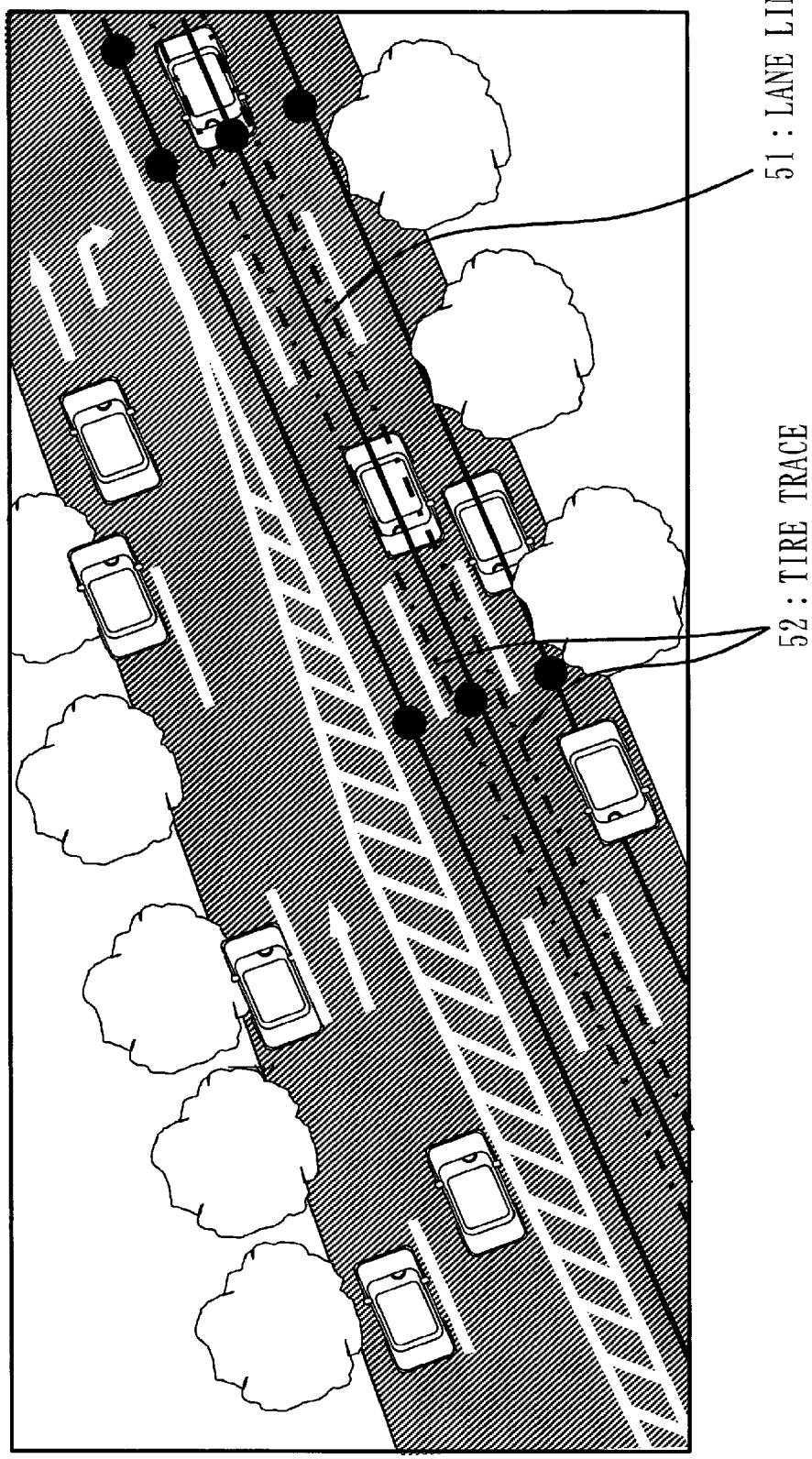
FIG. 3 is a conceptual diagram of how tire traces are formed in Embodiment 1.

FIG. 2 is a conceptual diagram of a dynamic map according to the present embodiment. FIG. 3 is a conceptual diagram of how tire traces are formed in the present embodiment.

In FIG. 2, lane links 51 which are each a middle line in a widthwise direction of the road, that is, in the transverse direction of the road, are indicated by dotted lines. In FIG. 3, how tire traces 52 are formed on two sides of a lane link 51 indicated by solid lines is indicated by alternate long-and-snort dashed lines.

When automated driving travel considering traffic jam information or regulation information is to be performed with using a dynamic map, the automated driving vehicle 10 travels over a road middle line called lane link 51 which is stored in the map data of the dynamic map. Many automated driving vehicles 10 travel over the road middle line with a high positioning precision of 50 cm or less, preferably 25 cm or less, and more preferably 10 cm or less. Therefore, it is necessary to prevent the tire traces 52 from being formed at the same positions due to travel of the automated driving vehicles 10.

A configuration of the automated driving system 500 according to the present embodiment will be described with referring to FIG. 4.

The automated driving system 500 is provided with the in-vehicle apparatus 100 mounted in the automated driving vehicle 10, and the roadside apparatus 30, as described above.

Figure 4:
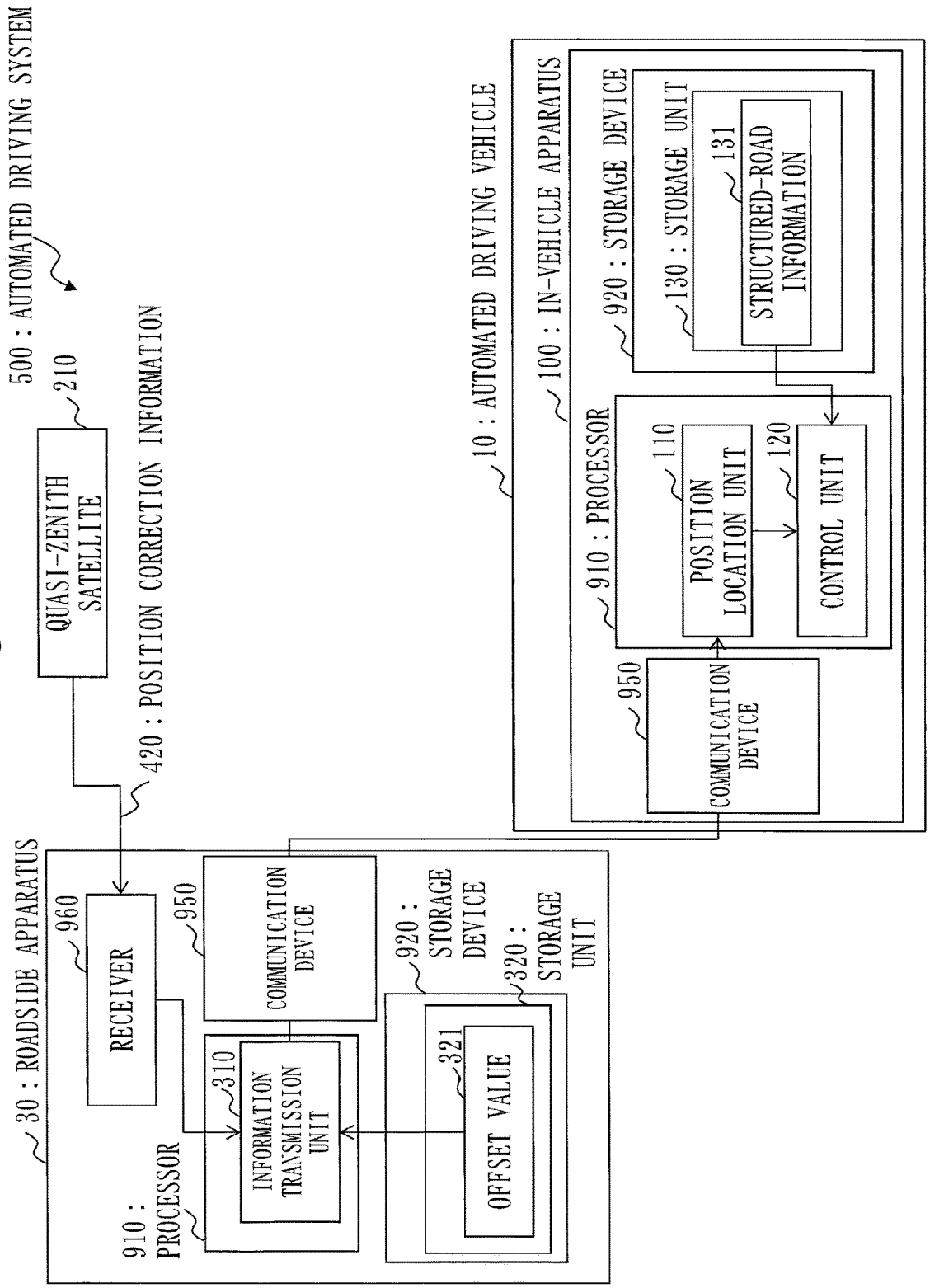
FIG. 4 is a configuration diagram of an automated driving system according to Embodiment 1.

As illustrated in FIG. 4, the in-vehicle apparatus 100 and the roadside apparatus 30 are each a computer. The in-vehicle apparatus 100 and the roadside apparatus 30 are each provided with a processor 910 as well as other hardware devices such as a storage device 920, a communication device 950, and a receiver 960. In FIG. 4, the processor 910, the storage device 920, the communication device 950, and the receiver 960 are denoted by the same reference numerals between the in-vehicle apparatus 100 and the roadside apparatus 30. This aims at simplifying the description. The in-vehicle apparatus 100 and the roadside apparatus 30 are each provided with the processor, the storage device, the communication device, and the receiver. Note that in the present embodiment, the receiver 960 is provided only to the roadside apparatus 30. However, in Embodiment 3 to be described later, the receiver 960 is provided to the in-vehicle apparatus 100 as well.

The storage device 920 is provided with a memory and an auxiliary storage device.

The processor 910 is connected to the other hardware devices via signal lines and controls these other hardware devices.

The in-vehicle apparatus 100 is provided with a position location unit 110, a control unit 120, and a storage unit 130, as functional elements. Structured-road information 131 is stored in the storage unit 130.

The roadside apparatus 30 is provided with an information transmission unit 310 and a storage unit 320, as functional elements. An offset value 321 is stored in the storage unit 320. The offset value 321 is also called offset information.

Functions of the position location unit 110 and control unit 120 of the in-vehicle apparatus 100, and a function of the information transmission unit 310 of the roadside apparatus 30 are implemented by software.

The storage unit 130 is provided to the storage device 920 of the in-vehicle apparatus 100. The storage unit 320 is provided to the storage device 920 of the roadside apparatus 30.

The processor 910 is a device that executes an automated driving program. The automated driving program is a program that implements the functions of the position location unit 110 and control unit 120 of the in-vehicle apparatus 100, and the function of the information transmission unit 310 of the roadside apparatus 30.

The processor 910 is an Integrated Circuit (IC) which performs computation processing. Specific examples of the processor 910 include a CPU, a Digital Signal Processor (DSP), and a Graphics Processing Unit (GPU).

The memory is a storage device that stores data temporarily. Specific examples of the memory include a Static Random Access Memory (SRAM) and a Dynamic Random Access Memory (DRAM).

The auxiliary storage device is a storage device that keeps data. Specific examples of the auxiliary storage device include an HDD. Alternatively, the auxiliary storage device may be a portable storage medium such as an SD (registered trademark) memory card, a CF, a NAND flash, a flexible disk, an optical disk, a compact disk, a blu-ray (registered trademark) disk, and a DVD. Note that HDD stands for Hard Disk Drive, SD (registered trademark) for Secure Digital, CF for CompactFlash (registered trademark), and DVD for Digital Versatile Disk.

The communication device 950 communicates with the other devices via a network. The communication device 950 has a receiver and a transmitter. The communication device 950 is connected to a communication network such as a LAN, the Internet, and a telephone line by wireless connection. The communication device 950 is specifically a communication chip or a Network Interface Card (NIC). The communication device 950 performs road-to-vehicle communication between the in-vehicle apparatus 100 and the roadside apparatus 30 according to communication standard ETC (registered trademark) (Electronic Toll Collection System) 2.0 IEEE802.11p specifically.

The receiver 960 receives the position correction information 420 from the quasi-zenith satellite 210. The position correction information 420 is specifically an L6 signal. That is, the receiver 960 is a receiver that receives the L6 signal from the quasi-zenith satellite 210.

The automated driving program is read by the processor 910 and executed by the processor 910. Not only the automated driving program but also an Operating System (OS) is stored in the memory. The processor 910 executes the automated driving program while executing the OS. The automated driving program and the OS may be stored in the auxiliary storage device. The automated driving program and the OS stored in the auxiliary storage device are loaded to the memory and executed by the processor 910. The automated driving program may be incorporated in the OS partially or entirely.

Each of the in-vehicle apparatus 100 and the roadside apparatus 30 may be provided with a plurality of processors that substitute for the processor 910. The plurality of processors share execution of the automated driving program. Each processor is a device that executes the automated driving program, just as the processor 910 does.

Data, information, a signal value, and a variable value which are used, processed, or outputted by the automated driving program are stored in the memory, the auxiliary storage device, or a register or cache memory in the processor 910.

"Unit" in the position location unit 110 and control unit 120 of the in-vehicle apparatus 100, and "unit" in the information transmission unit 310 of the roadside apparatus 30 may be replaced by "process", "procedure", or "stage".

The automated driving program causes the computer to execute processes, procedures, or stages corresponding to the units mentioned above with their "unit" being replaced by "process", "procedure", or "stage". The automated driving method is a method that is performed as the automated driving system 500 executes the automated driving program.

The automated driving program may be stored in a computer readable recording medium and may be provided in the form of the recording medium. Also, the automated driving program may be provided in the form of a program product.

Outline Description of Functional Element

The in-vehicle apparatus 100 effects automated driving such that a vehicle position through which the automated driving vehicle 10 travels deviates from a center in the transverse direction of the road by the offset value 321 in the transverse direction of the road.

The structured-road information 131 is information obtained by linearization, that is, vector-data conversion, of information related to a road structure including white lines of the road. The structured-road information 131 is stored in the storage unit 130 as dynamic map static information. The white lines of the road are specifically a center line, a road shoulder line, a side road line, a stop line, a pedestrian crossing, and so on.

The position location unit 110 receives the positioning information 410 from the GNSS satellite 220. The positioning information 410 is specifically L1, L2, and L5 signals, or an E1 (corresponding to L1) signal, an E5 (corresponding to L5) signal, and an E6 signal. That is, the position location unit 110 is a receiver that receives the L1, L2, and L5 signals from the GNSS satellite 220.

The position location unit 110 receives the position correction information 420 from the quasi-zenith satellite 210. The position correction information 420 is specifically an L6 signal. That is, the position location unit 110 is a receiver that receives the L6 signal from the quasi-zenith satellite 210.

The position location unit 110 corrects a positioning error (a clock error, a GNSS satellite bias error, a GNSS satellite orbital error, an ionospheric delay, a tropospheric delay, and so on) included in the positioning information 410, using the position correction information 420 transmitted from quasi-zenith satellite 210 and the positioning information 410 received from the GNSS satellite 220, and performs position locating with high precision of 50 cm or less, preferably 25 cm or less, and further preferably 10 cm or less, thereby locating a vehicle position P of the automated driving vehicle 10.

The position correction information 420 is preferably based on an information compression format "Compact SSR" for an SSR message (RTK-PPP method; real-time kinematic precision point positioning) of RTCM SC-104 "RTCM STANDARD 10403.2" which is defined as, for example, a standard of positioning augmentation information. However, the position correction information 420 is not limited to this, and may be position correction information based on another format.

The control unit 120 controls steering of the vehicle such that the vehicle position P located by the position location unit 110 is present along a middle line between adjacent dividing lines of the road. A middle line between adjacent dividing lines of the road is a middle line of a lane. A middle line between adjacent dividing lines of the road is called a traveling guide line or a traveling line as well. Alternatively, the control unit 120 controls steering of the vehicle such that the vehicle position P located by the position location unit 110 is present along a middle line between a dividing line and a side road line. A middle line between a dividing line and a side road line is a middle line of a lane. A middle line between a dividing line and a side road line is also called a traveling line or a lane link.

The roadside apparatus 30 is a roadside road-to-vehicle communication device installed on a periphery of a road, or a communication device installed such that its communication coverage embraces the road. The roadside apparatus 30 is mounted in a structure installed on a roadside of the road.

The information transmission unit 310 transmits position correction information 350 to the in-vehicle apparatus 100.

There may also be a case where the in-vehicle apparatus 100 receives the position correction information 350 from a quasi-zenith satellite directly.

Description of Behavior

Automated driving processing S100 according to the present embodiment will be described with referring to FIG. 5.

In step S110, the position correction information 420 is transmitted from the quasi-zenith satellite 210.

In step S120, the roadside apparatus 30 receives the position correction information 420 from the quasi-zenith satellite 210 using the receiver 960.

In step S130, the information transmission unit 310 of the roadside apparatus 30 transmits the offset value 321. Specifically, the information transmission unit 310 transmits the offset value 321 stored in the storage unit 320 and the position correction information 420 received from the quasi-zenith satellite 210, to the in-vehicle apparatus 100 via the communication device 950.

Figure 6:
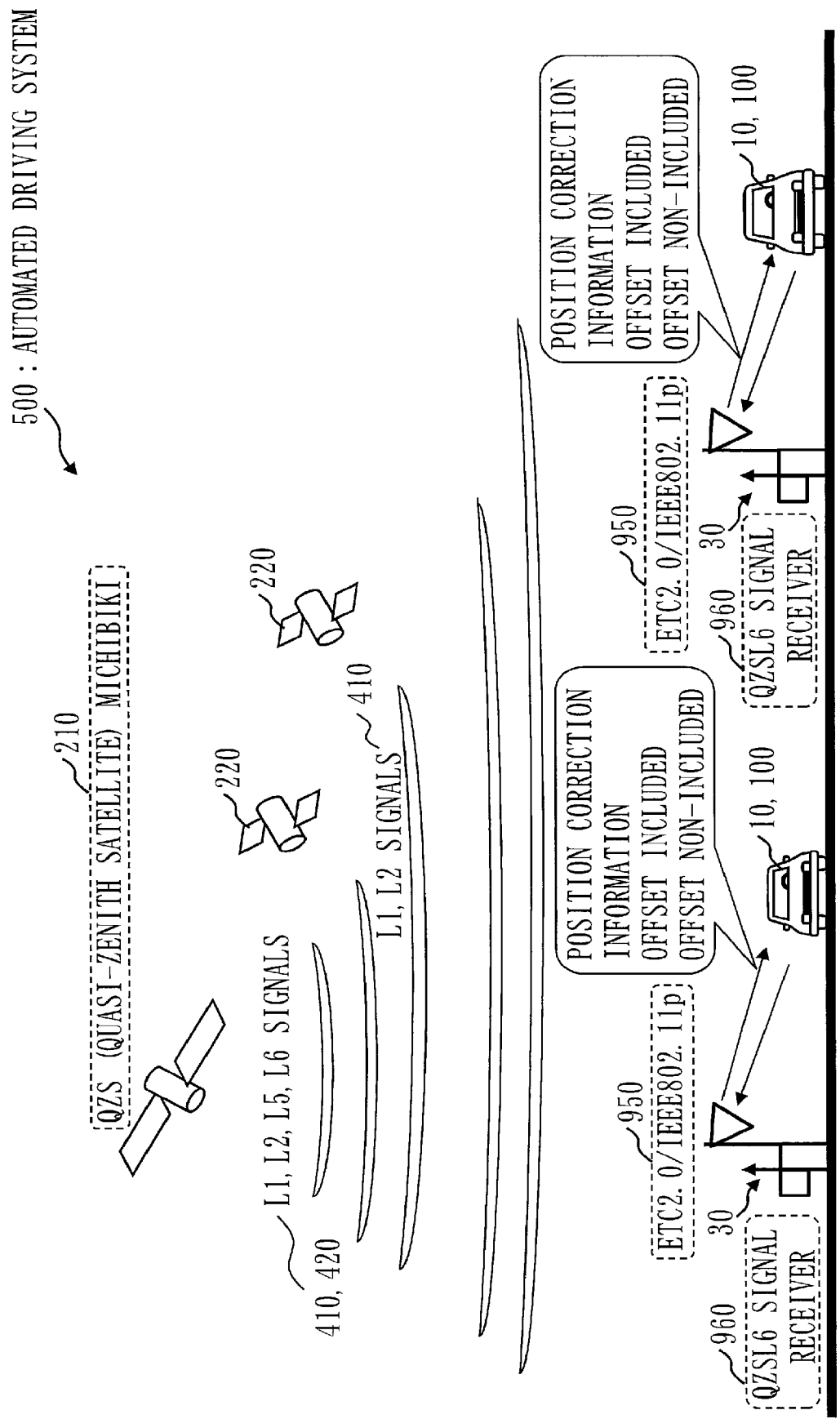
FIG. 6 is a schematic diagram illustrating automated driving processing according to Embodiment 1.

FIG. 6 is a schematic diagram illustrating automated driving processing S100 according to the present embodiment.

As illustrated in FIG. 6, the information transmission unit 310 may alternately choose a case of adding the offset value 321 to the position correction information 420, that is, offset included, and a case of not adding the offset value 321 to the position correction information 420, that is, offset non-included. Alternatively, the information transmission unit 310 may choose offset included and offset non-included randomly. Alternatively, the storage unit 320 of the roadside apparatus 30 may store a plurality of offset values 321 having different values. The information transmission unit 310 may choose an offset value from among the plurality of offset values 321 randomly and transmit the chosen offset value to the in-vehicle apparatus 100. The offset value 321 is set to fall within a range of 50 cm to 100 cm.

In step S140, the in-vehicle apparatus 100 receives the position correction information 420 and the offset value 321 via the communication device 950.

In step S150, the position location unit 110 of the in-vehicle apparatus 100 locates the vehicle position P of the automated driving vehicle 10, using the positioning information 410 and the position correction information 420.

In step S160, the control unit 120 of the in-vehicle apparatus 100 effects automated driving while deviating the vehicle position P, based on the offset value 321 transmitted from the information transmission unit 310 of the roadside apparatus 30, by the offset value 321 in the transverse direction of the road.

The automated driving vehicle 10 can perceive the vehicle position P of its own accurately with an error within a radius of 30 cm. This will lead to formation of tire traces. In order to prevent formation of tire traces, the control unit 120 of the in-vehicle apparatus 100 applies an offset within a range of ±50 cm to ±1 m, to the vehicle position P of the automated driving vehicle 10 in a road-width direction of the road. Then, when traveling through the middle of the road width of the road, the automated driving vehicle 10 travels with a deviation within a range of ±50 cm to ±1 m in the direction of the road width. As a result, the automated driving vehicle will not travel the same place, and tire traces will not form easily.

Automated driving processing S100a according to the present embodiment will be described with referring to FIG. 7.

Figure 5:
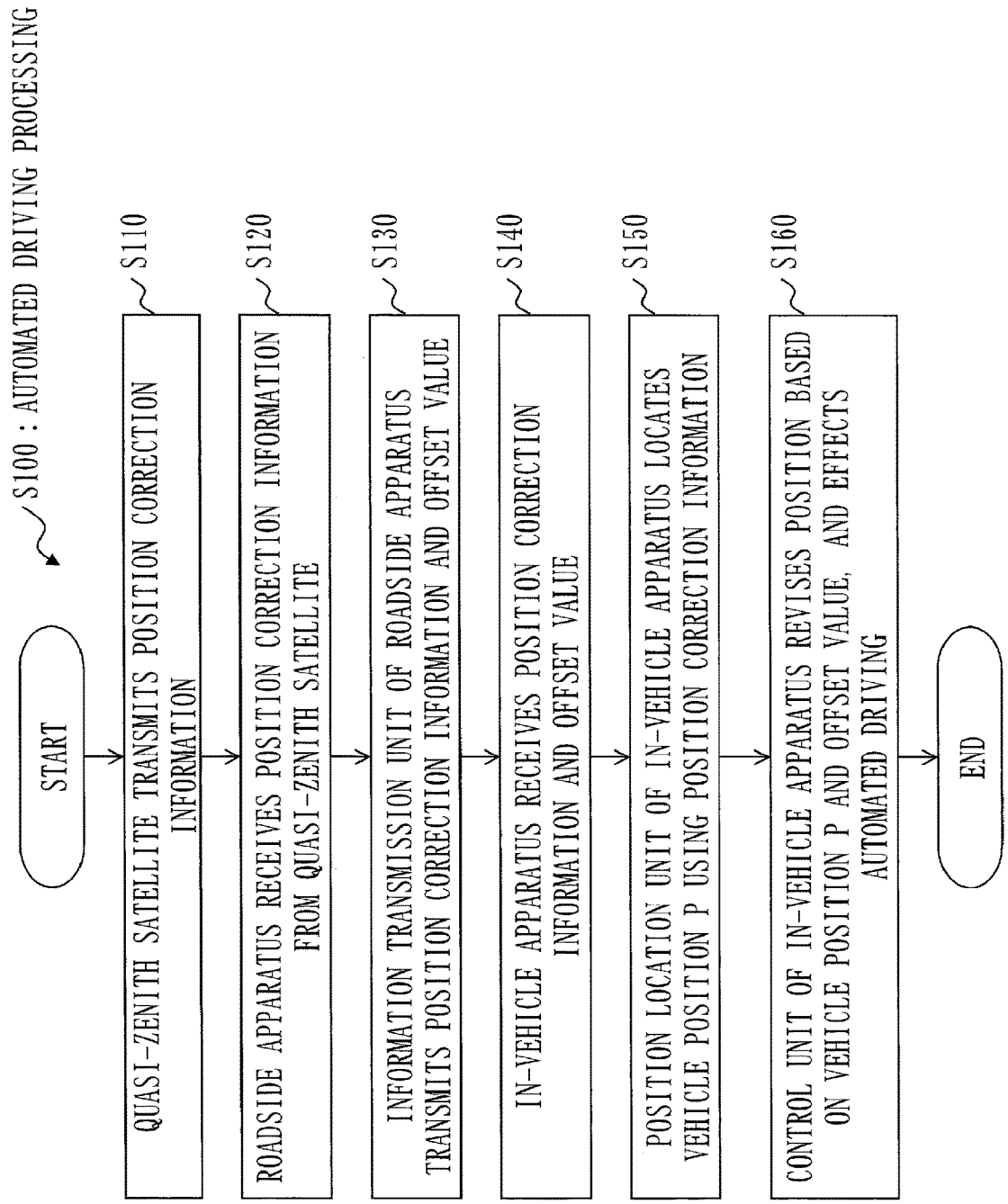
FIG. 5 is a flowchart of automated driving processing according to Embodiment 1.
Figure 7:
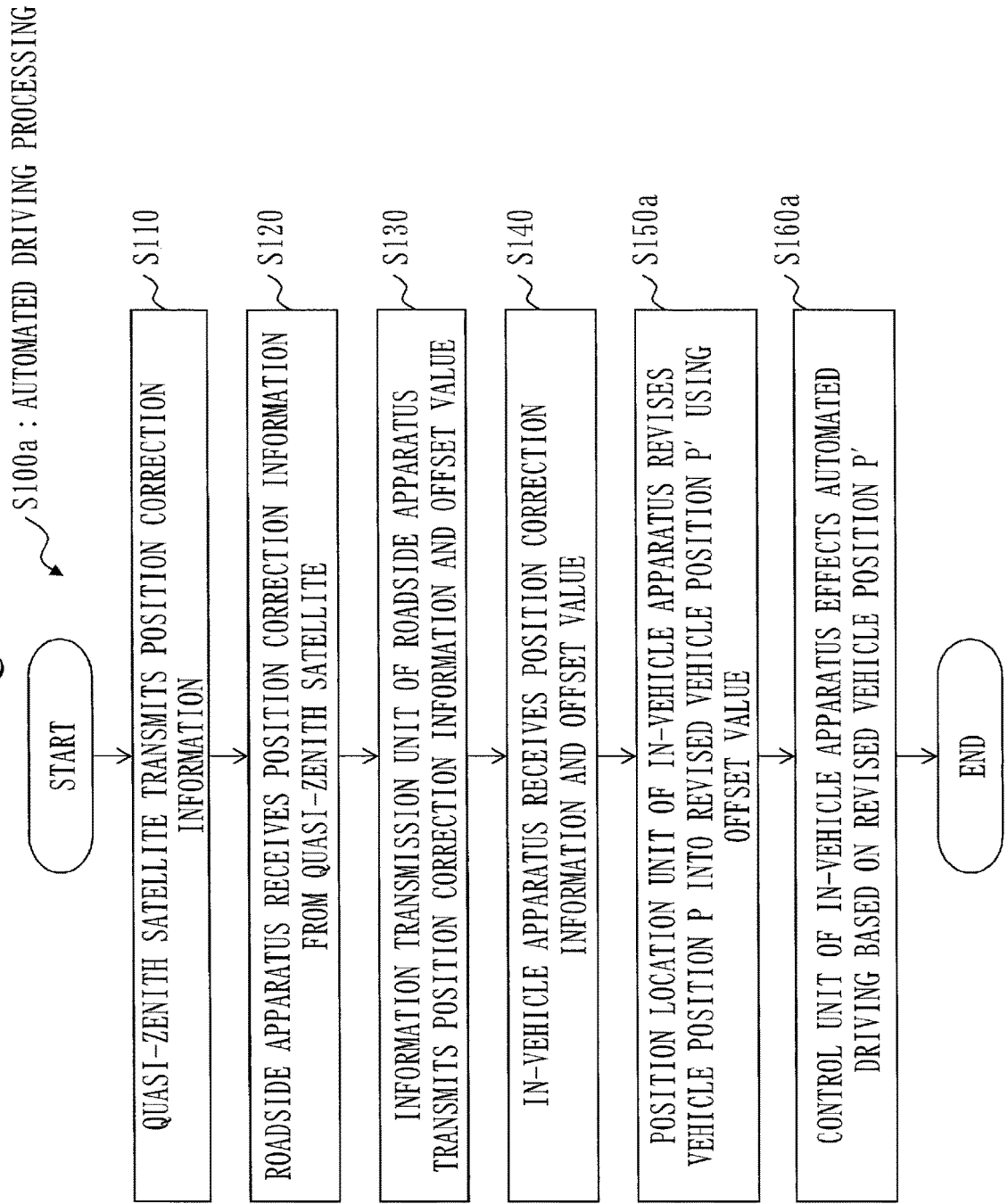
FIG. 7 is a flowchart of automated driving processing according to Embodiment 1.

In automated driving processing S100a of FIG. 7, processes of step S110 through step S140 are identical with those of automated driving processing S100 of FIG. 5. That is, the in-vehicle apparatus 100 receives the position correction information 420 and the offset value 321 from the roadside apparatus 30 via the communication device 950.

In step S150a, the position location unit 110 of the in-vehicle apparatus 100 locates the vehicle position P of the automated driving vehicle 10, using the positioning information 410 and the position correction information 420. Also, the position location unit 110 deviates the vehicle position P, based on the offset value 321 transmitted from the information transmission unit 310, by the offset value 321 in the transverse direction of the road, and outputs a revised vehicle position P' deviated by the offset value 321 in the transverse direction of the road.

In step S160a, the control unit 120 of the in-vehicle apparatus 100 takes as input the revised vehicle position P' from the position location unit 110 and effects automated driving using the revised vehicle position P'.

In automated driving processing S100a according to the present embodiment, in order to prevent formation of tire traces, the position location unit 110 of the in-vehicle apparatus 100 applies an offset within a range of ±50 cm to ±1 m to the located vehicle position P in the road-width direction of the road. Then, the automated driving vehicle 10, when traveling through the middle of the road width of the road, travels with a deviation within a range of ±50 cm to ±1 m in the road-width direction. As a result, the automated driving vehicle will not travel the same place, and tire traces will not form easily.

Other Configurations

In the present embodiment, the functions of the position location unit 110 and control unit 120 of the in-vehicle apparatus 100 and the function of the information transmission unit 310 of the roadside apparatus 30 are implemented by software. In a modification, the functions of the position location unit 110 and control unit 120 of the in-vehicle apparatus 100 and the function of the information transmission unit 310 of the roadside apparatus 30 may be implemented by hardware.

Figure 8:
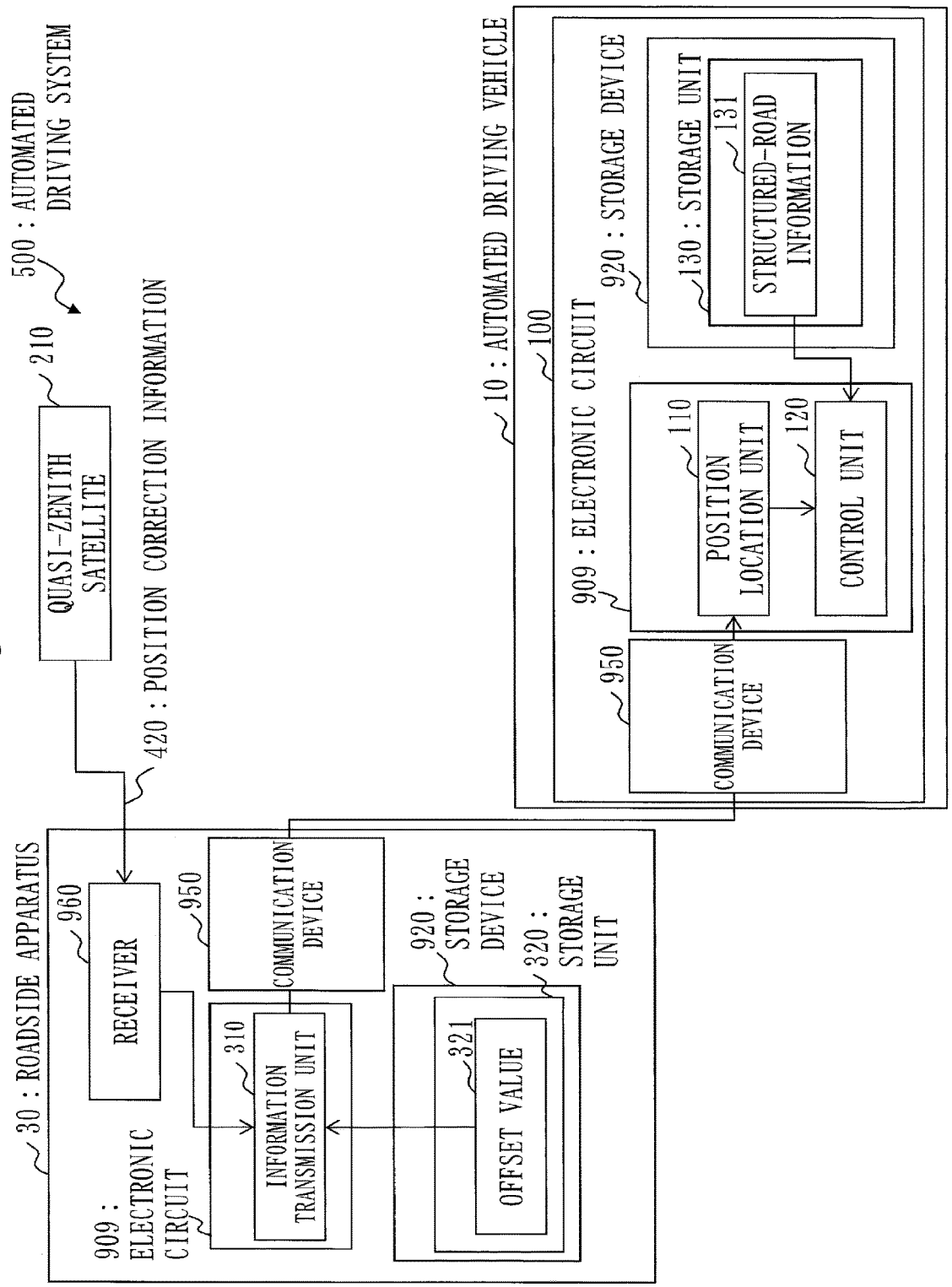
FIG. 8 is a configuration diagram of an automated driving system according to a modification of Embodiment 1.

FIG. 8 is a diagram illustrating a configuration of an automated driving system 500 according to a modification of the present embodiment.

An in-vehicle apparatus 100 and a roadside apparatus 30 are each provided with an electronic circuit 909, a storage device 920, a communication device 950, and a receiver 960.

The electronic circuits 909 are dedicated electronic circuits that implement functions of a position location unit 110 and control unit 120 of the in-vehicle apparatus 100 and a function of an information transmission unit 310 of a roadside apparatus 30.

The electronic circuit 909 is specifically a single circuit, a composite circuit, a programmed processor, a parallel-programmed processor, a logic IC, a GA, an ASIC, or an FPGA. Not that GA stands for Gate Array, ASIC for Application Specific Integrated Circuit, and FPGA for Field-Programmable Gate Array.

In the in-vehicle apparatus 100, the functions of the position location unit 110 and control unit 120 of the in-vehicle apparatus 100 may be implemented by one electronic circuit, or by a plurality of electronic circuit through distribution. In the roadside apparatus 30, the function of the information transmission unit 310 of the roadside apparatus 30 may be implemented by one electronic circuit, or by a plurality of electronic circuit through distribution.

In another modification, some of functions of a position location unit 110 and control unit 120 of an in-vehicle apparatus 100 may be implemented by an electronic circuit, and the remaining functions may be implemented by software. Part of a function of an information transmission unit 310 of a roadside apparatus 30 may be implemented by an electronic circuit, and the remaining part of the function may be implemented by software.

The processors and electronic circuits are each called processing circuitry. That is, in the in-vehicle apparatus 100, the functions of the position location unit 110 and control unit 120 of the in-vehicle apparatus 100 are implemented by processing circuitry. In the roadside apparatus 30, the function of the information transmission unit 310 of the roadside apparatus 30 is implemented by processing circuitry.

In the in-vehicle apparatus 100, "unit" in the position location unit 110 and control unit 120 of the in-vehicle apparatus 100 may be replaced by "stage" or "process". In the roadside apparatus 30, "unit" in the information transmission unit 310 of the roadside apparatus 30 may be replaced by "stage" or "process". Likewise, "process" in a position location process and control process of the in-vehicle apparatus 100, and "process" in an information transmission process of the roadside apparatus 30 may be replaced by "program", "program product", or "computer readable storage medium recorded with a program".

Description of Effect of Embodiment

With the automated driving system 500 according to the present embodiment, the roadside apparatus transmits an offset value such that the vehicle travels along the lane link of the lane with a deviation from the lane link in the transverse direction, based on the dynamic map static information. The in-vehicle apparatus controls the vehicle such that the vehicle consequently travels through a position that is offset from the original travel line. This can prevent formation of track traces on the road that accompanies automated travel.

Embodiment 2

In the present embodiment, a difference from Embodiment 1 will be described. The same configuration as in Embodiment 1 will be denoted by the same reference numeral, and its description will be omitted.

A configuration of an automated driving system 500 according to the present embodiment is the same as that in FIG. 4 described in Embodiment 1.

The present embodiment will describe a mode in which an information transmission unit 310 of a roadside apparatus 30 revises position correction information 420 by an offset value 321.

Figure 9:
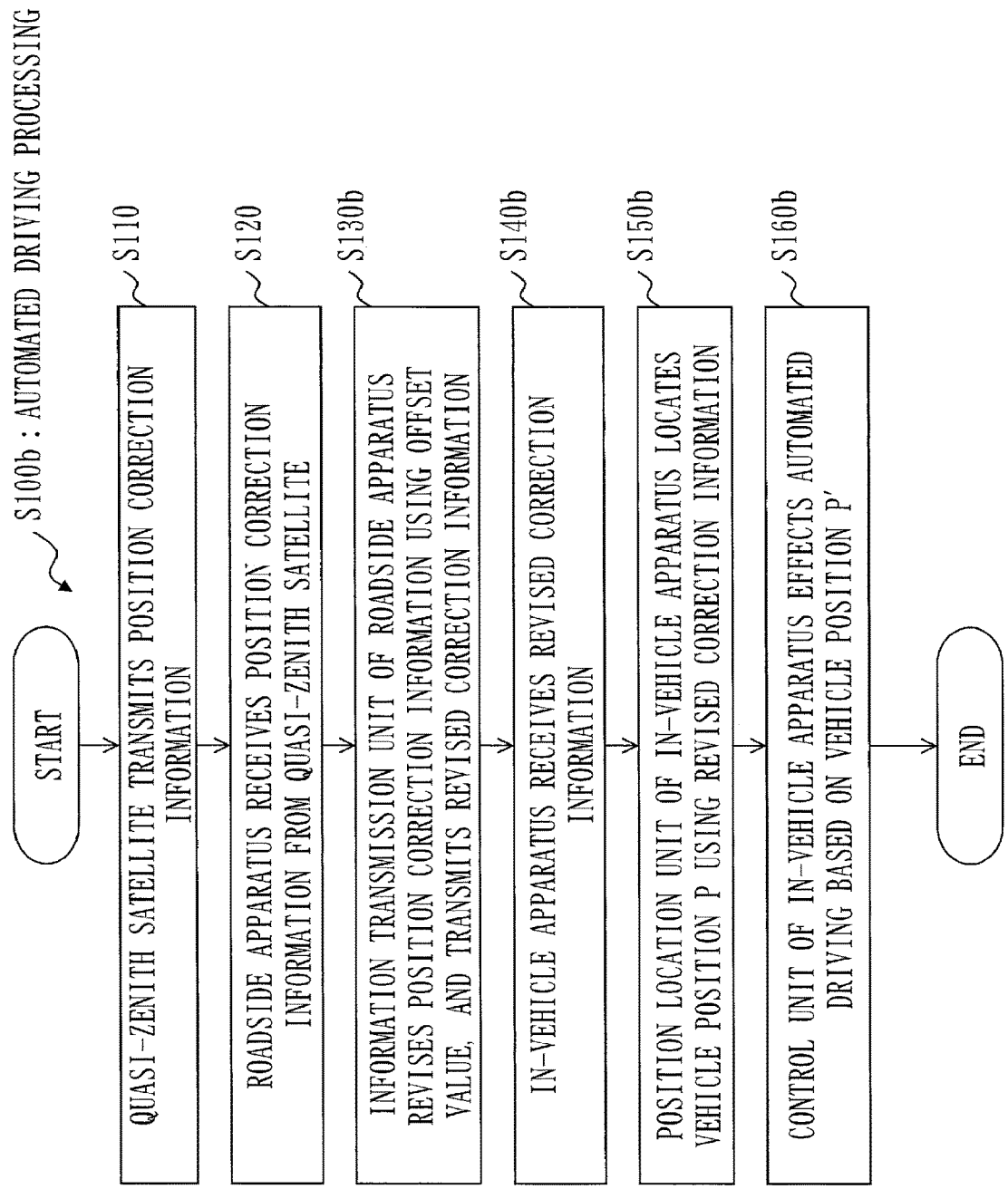
FIG. 9 is a flowchart of automated driving processing according to Embodiment 2.

Automated driving processing S100b according to the present embodiment will be described with referring to FIG. 9.

Step S110 to step S120 are the same as those in Embodiment 1. That is, the roadside apparatus 30 receives the position correction information 420 from the quasi-zenith satellite 210.

In step S130b, the information transmission unit 310 of the roadside apparatus 30 revises the position correction information 420 into revised correction information 420b, using the offset value 321. The information transmission unit 310 revises the position correction information 420 such that a position corrected by the position correction information 420 deviates by the offset value 321 in a transverse direction of the road. The information transmission unit 310 transmits the revised correction information 420b.

In step S140b, an in-vehicle apparatus 100 receives the revised correction information 420b from the roadside apparatus 30, using a communication device 950.

In step S150b, a position location unit 110 of the in-vehicle apparatus 100 locates a vehicle position P of an automated driving vehicle 10, using the revised correction information 420b transmitted from the roadside apparatus 30.

In step S160b, a control unit 120 of the in-vehicle apparatus 100 takes as input the vehicle position P from the position location unit 110 and effects automated driving, using the vehicle position P.

In the automated driving system according to the present embodiment, in order to prevent formation of tire traces, the roadside apparatus applies an offset within a range of ±50 cm to ±1 m in a road-width direction of the road, to the position correction information to be transmitted to the automated driving vehicle. When traveling through the middle of the road-width direction of the road, the automated driving vehicle 10 which has received the position correction information being offset by the roadside apparatus, that is, revised correction information, travels with a deviation within a range of ±50 cm to ±1 m in the direction of the road width, based on the information from the roadside apparatus 30. As a result, the automated driving vehicle will not travel the same place, and tire traces will not form easily.

Embodiment 3

The present embodiment will describe a matter that is different from Embodiments 1 and 2.

The same configuration as those in Embodiments 1 and 2 will be denoted by the sane reference numeral as in Embodiments 1 and 2, and its description will be omitted.

Figure 10:
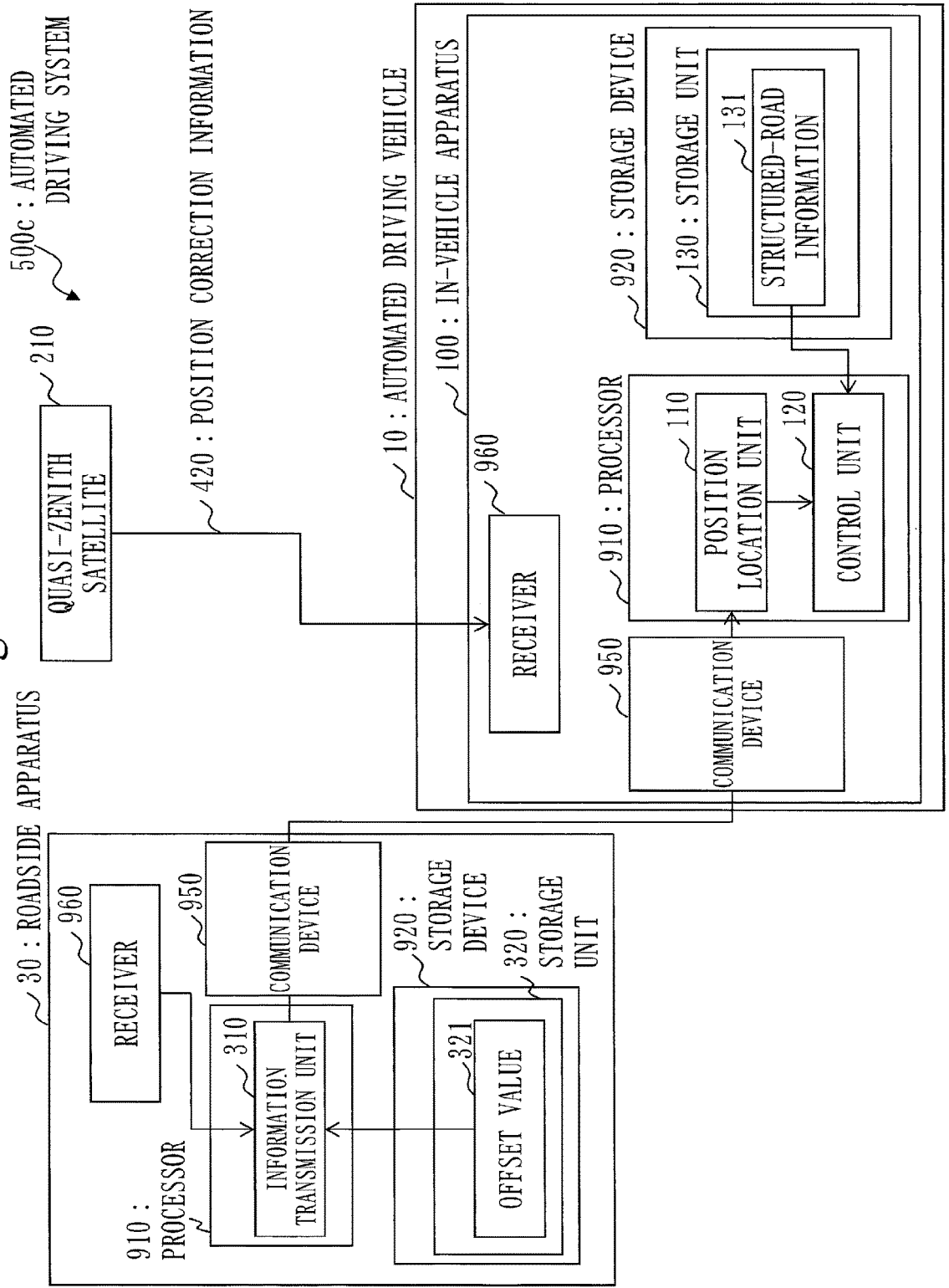
FIG. 10 is a configuration diagram of an automated driving system according to Embodiment 3.

A configuration of an automated driving system 500c according to the present embodiment will be described with referring to FIG. 10.

In the automated driving system 500c according to the present embodiment, an in-vehicle apparatus 100 is provided with a receiver 960 which receives position correction information 420 from a quasi-zenith satellite 210.

The present embodiment will describe a mode in which the in-vehicle apparatus 100 receives the position correction information 420 from the quasi-zenith satellite 210 directly.

Automated driving processing S100c according to the present embodiment will be described with referring to FIG. 11.

Step S110 is the same as that in Embodiment 1. The quasi-zenith satellite 210 transmits the position correction information 420.

In step S120c, the in-vehicle apparatus 100 receives the position correction information 420 from the quasi-zenith satellite 210, using the receiver 960.

In step S130c, an information transmission unit 310 of a roadside apparatus 30 transmits an offset value 321 to the in-vehicle apparatus 100.

In step S140c, the in-vehicle apparatus 100 receives the offset value 321 from the roadside apparatus 30, using a communication device 950.

Step S150 and step S160 are the same as those in Embodiment 1. That is, a position location unit 110 of the in-vehicle apparatus 100 locates a vehicle position P of an automated driving vehicle 10, using positioning information 410 and the position correction information 420. Based on the offset value 321 transmitted from the information transmission unit 310 of the roadside apparatus 30, a control unit 120 of the in-vehicle apparatus 100 effects automated driving while deviating the vehicle position P by the offset value 321 in a transverse direction of the road.

Alternatively, the same processes as in step S150a and step S160a may be performed. That is, the position location unit 110 of the in-vehicle apparatus 100 locates the vehicle position P of the automated driving vehicle 10, using the positioning information 410 and the position correction information 420. Also, based on the offset value 321 transmitted from the information transmission unit 310, the position location unit 110 deviates the vehicle position P by the offset value 321 in the transverse direction of the road, and outputs a revised vehicle position P' deviated by the offset value 321 in the transverse direction of the road. Then, the control unit 120 of the in-vehicle apparatus 100 takes as input the revised vehicle position P' from the position location unit 110 and effects automated driving, using the revised vehicle position P'.

In automated driving processing S100c according to the present embodiment, the position correction information is received from the quasi-zenith satellite directly. In order to prevent formation of tire traces, the position location unit 110 of the in-vehicle apparatus 100 applies an offset within a range of ±50 cm to ±1 m in the direction of the road width, to the located vehicle position P. Then, when traveling through the middle of the road width, the automated driving vehicle 10 travels with a deviation within a range of ±50 cm to ±1 m in the direction of the road width. As a result, the automated driving vehicle will not travel the same place, and tire traces will not form easily.

In Embodiment 3, the in-vehicle apparatus receives the position correction information from the quasi-zenith satellite. In Embodiment 3, the functions of the roadside apparatus described in Embodiments 1 and 2 are divided between the quasi-zenith satellite and the roadside apparatus which is installed on the ground. In Embodiment 3, the quasi-zenith satellite transmits position correction information, and the roadside apparatus installed on the ground transmits offset information.

In Embodiments 1 and 3, a position location unit may receive the offset information and the position correction information from the quasi-zenith satellite. Alternatively, in Embodiment 2, the position location unit may receive the revised correction information, being position correction information added with the offset information, from the quasi-zenith satellite.

In Embodiments 1 to 3 described above, the individual units in the automated driving system are described as independent function blocks. However, the configuration of the automated driving system need not be configured as in the embodiments described above. The function blocks of the automated driving system may be configured in any manner as far as they can implement the functions described in the above embodiments.

Of Embodiments 1 to 3 described above, a plurality of portions may be practiced in combination. Alternatively, of the above embodiments, only one portion may be practiced. Furthermore, these embodiments may be practiced in any combination, entirely or partially.

The embodiments described above are essentially preferable exemplifications and are not intended to limit the scope of the present invention, the scope of the applied product of the present invention, and the scope of the usage of the present invention.

Various modifications can be made in the embodiments where necessary.

REFERENCE SIGNS LIST

10: automated driving vehicle; 30: roadside apparatus; 51: lane link; 52: tire trace; 100: in-vehicle apparatus; 110: position location unit; 120: control unit; 130, 320: storage unit; 131: structured-road information; 310: information transmission unit; 321: offset value; 210: quasi-zenith satellite; 220: GNSS satellite; 410: positioning information; 420: position correction information; 420b: revised correction information; 500, 500c: automated driving system; 909: electronic circuit; 910: processor; 920: storage device; 950: communication device; 960: receiver; P: vehicle position; P': revised vehicle position; S100, S100a, S100b, S100c: automated driving processing.

The invention claimed is:

1. An automated driving system comprising:
an in-vehicle apparatus which is mounted in an automated driving vehicle traveling a road by automated driving; and
a roadside apparatus to store an offset value,
wherein the in-vehicle apparatus comprises
processing circuitry
to locate a vehicle position of the automated driving vehicle, using positioning information received from a first satellite and position correction information transmitted from a second satellite that is a quasi-zenith satellite, and
to effect automated driving in which the vehicle position deviates from a center in a transverse direction of the road by an offset value in the transverse direction of the road, based on the offset value stored in the roadside apparatus and the vehicle position,
wherein the processing circuitry of the in-vehicle apparatus receives the offset value, takes as input the vehicle position, and effects automated driving while deviating the vehicle position by the offset value in the transverse direction of the road,
wherein the roadside apparatus comprises processing circuitry to transmit the offset value,
wherein the processing circuitry of the in-vehicle apparatus receives the offset value from the processing circuitry of the roadside apparatus,
wherein the roadside apparatus comprises a storage device which stores a plurality of offset values having different values, and
wherein the processing circuitry of the roadside apparatus chooses an offset value from among the plurality of offset values randomly.

2. The automated driving system according to claim 1, comprising:
a receiver to receive the position correction information transmitted from the quasi-zenith satellite,
wherein the roadside apparatus comprises processing circuitry to revise the position correction information into revised correction information such that a position corrected by the position correction information deviates by the offset value in the transverse direction of the road, and to transmit the revised correction information, wherein the processing circuitry of the in-vehicle apparatus locates the vehicle position of the automated driving vehicle, using the revised correction information transmitted from the roadside apparatus, and wherein the processing circuitry of the in-vehicle apparatus takes as input the vehicle position and effects automated driving, using the vehicle position.

3. The automated driving system according to claim 1, wherein the in-vehicle apparatus comprises a receiver which receives position correction information transmitted from the quasi-zenith satellite, and wherein the processing circuitry of the in-vehicle apparatus locates the vehicle position of the automated driving vehicle, using the position correction information.

4. The automated driving system according to claim 1, wherein the offset value is set to fall within a range of 50 cm to 100 cm.

5. An automated driving method for an automated driving system comprising an in-vehicle apparatus which is mounted in an automated driving vehicle traveling a road by automated driving, and a roadside apparatus, the automated driving method comprising by the roadside apparatus, storing an offset value, by the in-vehicle apparatus, locating a vehicle position of the automated driving vehicle, using positioning information received from a first satellite and position correction information transmitted from a second satellite that is a quasi-zenith satellite, and by the in-vehicle apparatus, effecting automated driving in which the vehicle position deviates from a center in a transverse direction of the road by an offset value in the transverse direction of the road, based on the offset value stored in the roadside apparatus and the vehicle position, wherein the method further includes receiving the offset value, taking as input the vehicle position, and effecting automated driving while deviating the vehicle position by the offset value in the transverse direction of the road, wherein the roadside apparatus transmits the offset value, wherein the in-vehicle apparatus receives the offset value from the roadside apparatus, wherein the roadside apparatus stores a plurality of offset values having different values, and wherein the roadside apparatus chooses an offset value from among the plurality of offset values randomly.

6. A non-transitory computer readable medium storing an automated driving program for an automated driving system comprising an in-vehicle apparatus which is mounted in an automated driving vehicle traveling a road by automated driving, and a roadside apparatus, the automated driving program causing a computer to execute a position location process of locating a vehicle position of the automated driving vehicle, using positioning information received from a first satellite and position correction information transmitted from a second satellite that is a quasi-zenith satellite, and a control process of effecting automated driving in which the vehicle position deviates from a center in a transverse direction of the road by an offset value in the transverse direction of the road, wherein the computer further executes receiving the offset value, taking as input the vehicle position, and effecting automated driving while deviating the vehicle position by the offset value in the transverse direction of the road, wherein the roadside apparatus transmits the offset value, wherein the in-vehicle apparatus receives the offset value from the roadside apparatus, wherein the roadside apparatus stores a plurality of offset values having different values, and wherein the roadside apparatus chooses an offset value from among the plurality of offset values randomly.

* * * * *